(12) United States Patent
Masters et al.

(10) Patent No.: US 9,643,614 B2
(45) Date of Patent: May 9, 2017

(54) SLIP AND ENERGY BASED CLUTCH PROTECTION

(71) Applicants: Ryan Masters, Auburn Hills, MI (US); Brace Bade, Royal Oak, MI (US); Craig B Ashmore, Davisburg, MI (US)

(72) Inventors: Ryan Masters, Auburn Hills, MI (US); Brace Bade, Royal Oak, MI (US); Craig B Ashmore, Davisburg, MI (US)

(73) Assignee: FCA US LLC, Auburn Hills, MI (US)

( * ) Notice: Subject to any disclaimer, the term of this patent is extended or adjusted under 35 U.S.C. 154(b) by 156 days.

(21) Appl. No.: 14/673,062

(22) Filed: Mar. 30, 2015

(65) Prior Publication Data
US 2016/0288793 A1 Oct. 6, 2016

(51) Int. Cl.
*B60W 30/186* (2012.01)
*B60W 30/188* (2012.01)
*B60W 50/00* (2006.01)

(52) U.S. Cl.
CPC ...... *B60W 30/186* (2013.01); *B60W 30/1882* (2013.01); *B60W 2050/0026* (2013.01); *B60W 2510/0241* (2013.01); *B60W 2510/0638* (2013.01); *B60W 2710/026* (2013.01); *B60W 2710/0666* (2013.01)

(58) Field of Classification Search
None
See application file for complete search history.

(56) References Cited

U.S. PATENT DOCUMENTS

| 4,651,142 | A | | 3/1987 | Klatt | |
|---|---|---|---|---|---|
| 5,823,912 | A | * | 10/1998 | Fischer | F16D 25/123 192/82 T |
| 8,234,050 | B2 | | 7/2012 | Burns et al. | |
| 2002/0183165 | A1 | * | 12/2002 | Mack | B60W 10/02 477/174 |
| 2014/0141935 | A1 | * | 5/2014 | Huff | B60W 30/18027 477/174 |
| 2014/0148305 | A1 | | 5/2014 | Yamazaki et al. | |

FOREIGN PATENT DOCUMENTS

WO 0172546 10/2001

* cited by examiner

*Primary Examiner* — Edwin A Young
(74) *Attorney, Agent, or Firm* — Ralph E. Smith

(57) ABSTRACT

Clutch protection systems and methods include calculating a slip of a clutch of a manual transmission based on an input rotational velocity of a flywheel coupled to a torque generating system. The calculated slip is used to calculate an energy into the clutch. In one implementation, an accumulated energy into the clutch is calculated based on a rate of the calculated energy and a torque request for the torque generating system is limited based on the accumulated energy. In one implementation, an energy capacity remaining in the clutch until a threshold indicative of damage occurring is calculated based on the calculated energy and a limited torque request for the torque generating system is generated. The limited torque request corresponds to an amount of allowable torque before full clutch engagement occurs, where this time is calculable based on a rate at which the clutch slip is decreasing.

10 Claims, 3 Drawing Sheets

SLIP AND ENERGY BASED CLUTCH PROTECTION

FIELD

The present application relates generally to manual transmissions and, more particularly, to systems and methods for slip and energy based clutch protection for manual transmissions.

BACKGROUND

A manual transmission is operable by a driver and configured to transfer torque from a torque generating system (e.g., an engine) to a drivetrain. The driver selects a gear of the manual transmission and controls engagement/disengagement of a clutch of the manual transmission. When partially engaged, the clutch is able to slip and thereby does not fully engage a flywheel coupled to the torque generating system. The friction between the clutch and the flywheel during clutch slip generates heat, which could potentially damage the clutch. In particular, a large amount of heat could be generated during a heavy launch of a vehicle, during which the clutch is slipping while the torque generating system is currently generating or about to generate a large amount of torque, such as in response to a torque request. A gear position sensor can be implemented and utilized to limit torque requests in certain gears (e.g., first gear), but such gear position sensors increase system costs. A clutch position sensor could additionally or alternatively be implemented, but this also increases costs. Thus, while such manual transmission systems work for their intended purpose, there remains a need for improvement in the relevant art.

SUMMARY

In accordance with an aspect of the invention, a clutch protection system is provided. In one exemplary implementation, the system includes a manual transmission configured to transfer torque from a torque generating system to a drivetrain, the manual transmission comprising a clutch and a controller configured to: calculate a slip of the clutch based on an input rotational velocity of the manual transmission, calculate an energy into the clutch based on the calculated slip, calculate an accumulated energy into the clutch based on a rate of the calculated energy, limit a torque request for the torque generating device based on the calculated accumulated energy, and control the torque generating system based on the limited torque request.

In some implementations, the controller is configured to limit the torque request using a lookup table of clutch slip versus accumulated energy. In some implementations, the controller is further configured to limit the torque request using a lookup table of clutch slip versus torque. In some implementations, the controller is further configured to limit the torque request using a lookup table of clutch slip versus time in slip.

In some implementations, the manual transmission is not associated with a gear position sensor or a clutch position sensor. In some implementations, the controller is configured to: delimit the limited torque request after a period, and control the torque generating system based on the torque request.

In accordance with an aspect of the invention, a clutch protection system is provided. In one exemplary implementation, the system includes a manual transmission configured to transfer torque from a torque generating system to a drivetrain, the manual transmission comprising a clutch, and a controller configured to: calculate a slip of the clutch based on an input rotational velocity of the manual transmission, calculate an energy into the clutch based on the calculated slip, based on the calculated energy, calculate an energy capacity remaining in the clutch until a predetermined threshold indicative of damage to the clutch, based on the calculated energy capacity, calculate a limited torque request corresponding to an amount of allowable torque before full clutch engagement is complete, the calculated limited torque request being less than a torque request for the torque generating system, and control the torque generating system based on the calculated limited torque request.

In some implementations, the controller is further configured to: calculate a time until full clutch engagement based on a rate at which the clutch slip is decreasing, and calculate the torque request based on the calculated time.

In some implementations, the manual transmission is not associated with a gear position sensor or a clutch position sensor. In some implementations, the controller is further configured to: after a period, control the torque generating system based on the torque request.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there remains a need for clutch protection techniques that do not utilize a gear position sensor or a clutch position sensor. Accordingly, techniques are presented for protecting a clutch of a manual transmission, as will be discussed in greater detail below. These techniques involve using clutch slip and clutch energy to limit a torque request for a torque generating system without the need for a gear position sensor or a clutch position sensor. The clutch slip can be used to calculate the clutch energy. The term "clutch slip" as used herein is indicative of slipping between a clutch plate and a flywheel of a torque generating system, which generates heat due to the friction between the components. The term "clutch energy" as used herein is indicative of an energy being input to the clutch from a flywheel coupled to the torque generating system, which could also be referred to as a rotational energy or an angular kinetic energy.

In one exemplary implementation, accumulated clutch energy is calculated based on the clutch energy and a rate of the clutch energy, and then the calculated accumulated clutch energy is utilized to limit the torque request to the torque generating system. In another exemplary implementation, an energy capacity remaining in the clutch until potential damage occurs is calculated based on the clutch energy, and then a limited torque request is generated corresponding to an amount of allowable torque before full clutch engagement is completed. In one exemplary implementation, a time until full clutch engagement is calculated based on a rate at which the clutch slip is decreasing, which is then utilized in calculating the limited torque request. These clutch prediction techniques can also be referred to as predictive techniques because they calculate expected or upcoming values in order to then limit the torque request to prevent potential clutch damage.

Figure 1:
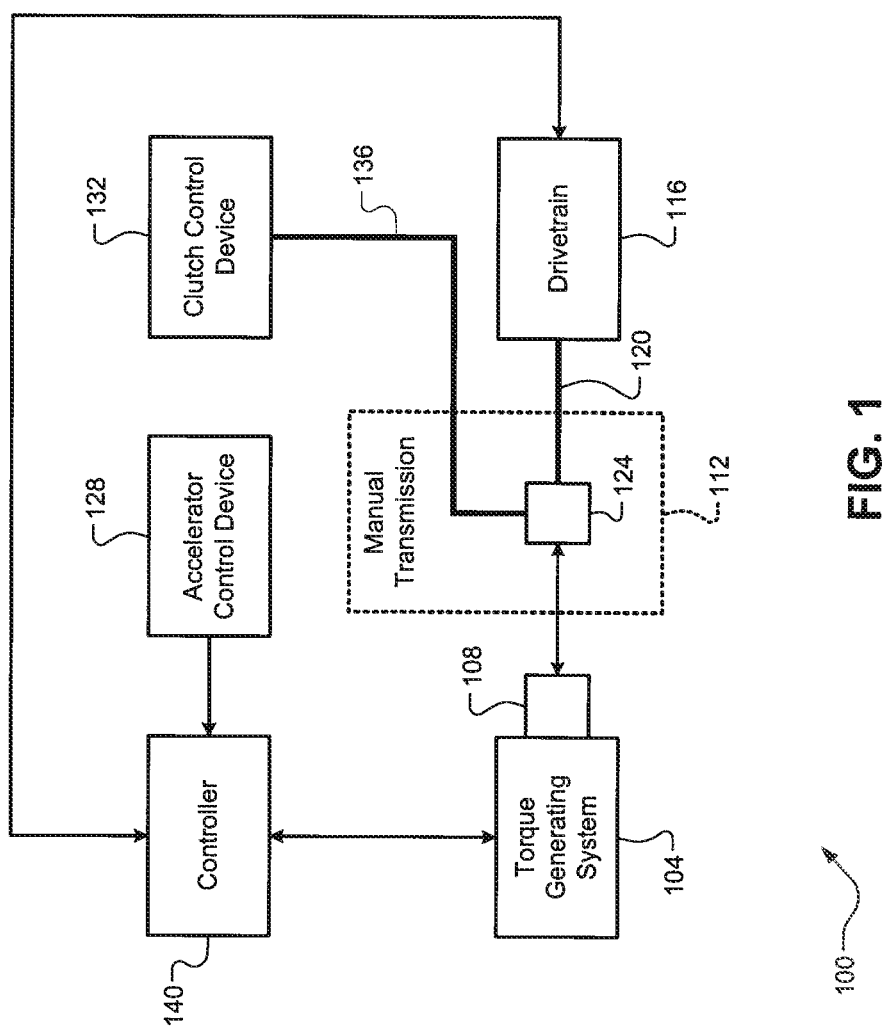
FIG. 1 is an example diagram of a vehicle according to the principles of the present disclosure.

Referring now to FIG. 1, an example functional block diagram of a vehicle 100 is illustrated. The vehicle 100 includes a torque generating system 104 configured to generate drive torque for propelling the vehicle 100. Examples of the torque generating system 104 include an engine, an electric motor, and combinations thereof. Examples of the engine include a spark ignition engine, a diesel engine, and a homogeneous charge compression ignition (HCCI) engine. The drive torque is generated by the torque generating system 104 at a flywheel 108. A manual transmission 112 is configured to transfer the drive torque from the flywheel 108 to a drivetrain 116 of the vehicle 100. In one exemplary implementation, the flywheel 108 is coupled to either an engine crankshaft or to an electric motor output shaft.

The manual transmission 112 comprises an output shaft 120 coupled to the drivetrain 116 and one or more gears (not shown) for translating (e.g., multiplying) the drive torque generated at the flywheel 108 to a drive torque at the drivetrain 116. The manual transmission 112 further comprises a clutch 124 coupled to the output shaft 120 and configured to fully engage/disengage or partially engage/disengage with the flywheel 108. In one exemplary implementation, the clutch 124 is a plate configured to mate with the flywheel 108 when fully engaged. The configuration of the clutch 124 and the flywheel 108 allows for partial engagement/disengagement and thus clutch slip. It will be appreciated that while a single clutch 124 is illustrated and discussed herein, the manual transmission 112 could include a plurality of clutches.

The vehicle 100 further includes an accelerator control device 128, a clutch control device 132 coupled to the clutch 124 by a mechanical cable or linkage 136, and a controller 140. Examples of the accelerator and clutch control devices 128, 132 are pedals that are operated by a driver of the vehicle 100. In one exemplary implementation, the clutch 124 could be electronically controlled by the controller 140 (e.g., no mechanical linkage 136). The controller 140 is configured to control operation of the vehicle 100. Specifically, the controller 140 is configured to control the torque generating system 104 to generate a desired torque corresponding to a torque request corresponding to input via the accelerator control device 128. Based on various control parameters (airflow, fuel injection, current from a battery system, etc.), the controller 140 is configured to calculate or otherwise estimate the drive torque generated by the torque generating system 104.

The controller 140 is also configured to perform the clutch protection techniques of the present disclosure. In one exemplary implementation, the controller 140 is configured to calculate the clutch slip, clutch energy, and other related parameters based on the following inputs: (1) engine or electric motor rotational speed, (2) vehicle speed, (3) engine or electric motor torque, and (4) time. As previously discussed, these parameters could be directly measured (e.g., engine/electric motor rotational speed and vehicle/drivetrain speed) and/or modeled based on other parameters (e.g., engine/electric motor torque). These inputs, however, do not include signals from a gear position sensor or a clutch position sensor. These clutch protection techniques will now be described in greater detail below.

Figure 2:
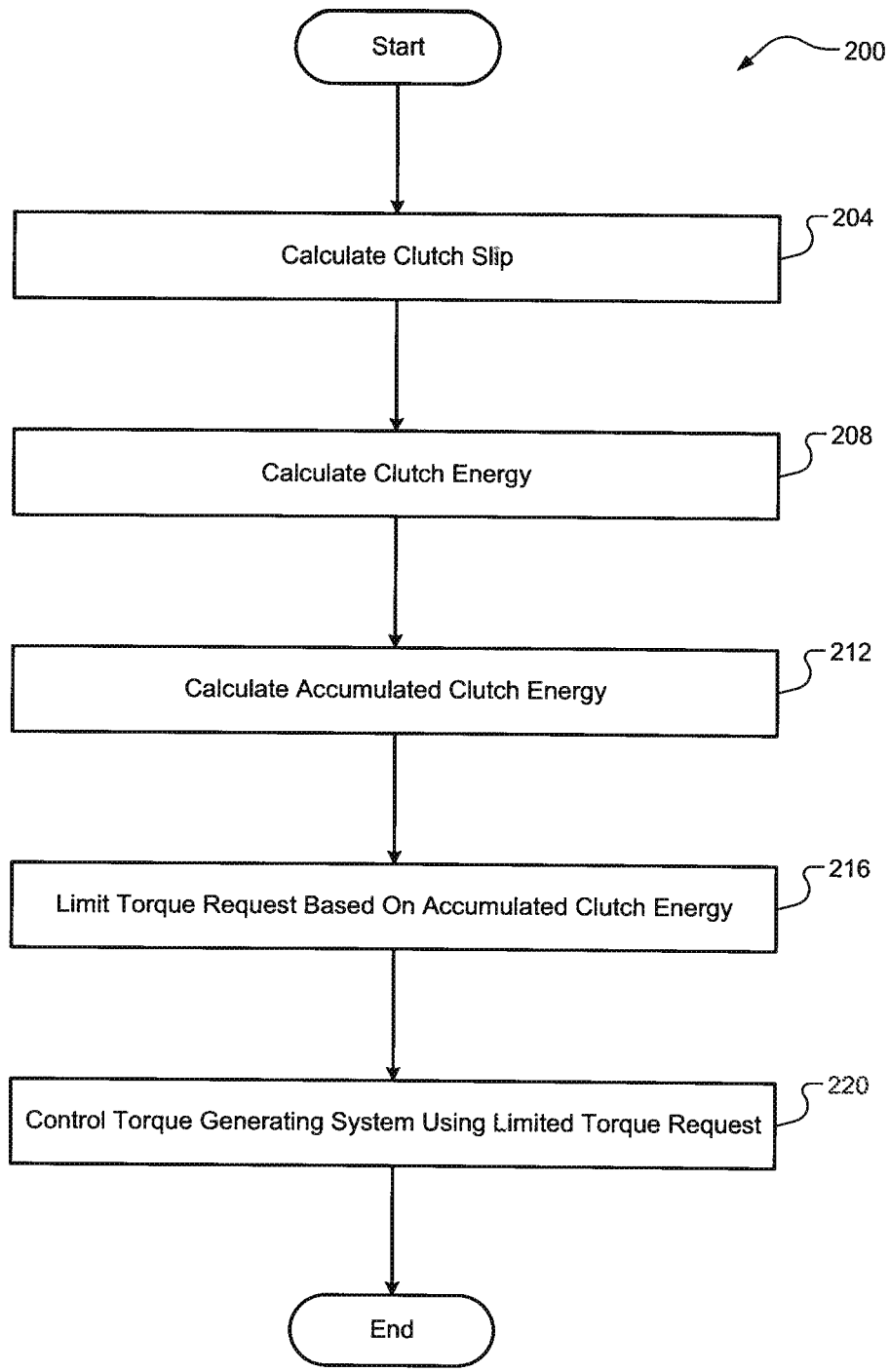
FIG. 2 is an example flow diagram of a clutch protection method according to the principles of the present disclosure.

Referring now to FIG. 2, an example flow diagram of a clutch protection method 200 is illustrated. At 204, the controller 140 calculates a slip of the clutch 124 based on an input rotational velocity of the flywheel 108. This clutch slip calculating can also be referred to as a prediction of upcoming clutch slip based on current parameters (input rotational speed, input torque, etc.). The rotational velocity of the flywheel 108 could be directly measured or modeled based on other inputs. The rotational velocity of the flywheel 108 could be proportional to a rotational speed of an engine crankshaft or an electric motor output shaft, which could be measured using a corresponding sensor (not shown). For example, the flywheel 108 could have a moment of inertia that causes it to resist changes in rotational speed from the torque generating system 104. In one exemplary implementation, an amount of energy stored at the flywheel 108 is proportional to a square of its rotational speed.

The clutch slip is calculated based on a difference between the input rotational speed and an expected rotational output speed (e.g., of the output shaft 120). This expected rotational output speed could be further based on a current gear ratio of the manual transmission 112. At 208, the controller 140 calculates an energy into the clutch 124 based on the calculated clutch slip. In one exemplary implementation, this clutch energy is calculated using a model based on the torque at the flywheel 108. At 212, the controller 140 calculates an accumulated energy into the clutch based on a rate of the clutch energy. This rate of the clutch energy can represent how long the clutch 124 is able to slip without potentially incurring damage. In one exemplary implementation, the accumulated energy is calculated based on a rate of change of the calculated energy over a period. At 216, the controller 140 limits a torque request for the torque generating device based on the calculated accumulated energy. In one exemplary implementation, this torque request is based on input via the accelerator control device 128.

Limiting the torque request, for example, could include comparing the calculated accumulated energy to one or more thresholds indicative of potential damage to the clutch 124 and decreasing the torque request accordingly to obtain the limited torque request. In one exemplary implementation, the controller 140 is configured to limit the torque request using a lookup table of clutch slip versus accumulated energy. In another exemplary implementation, the controller 140 is further configured to limit the torque request using a lookup table of clutch slip versus torque. In yet another exemplary implementation, the controller 140 is further configured to limit the torque request using a lookup table of clutch slip versus time in slip. At 220, the controller 140 controls the torque generating system based on the limited torque request. In one exemplary implementation, this limited torque control continues for a predetermined period or until the potential damage to the clutch 124 is no longer detected. The method 200 then ends or returns to 204.

Figure 3:
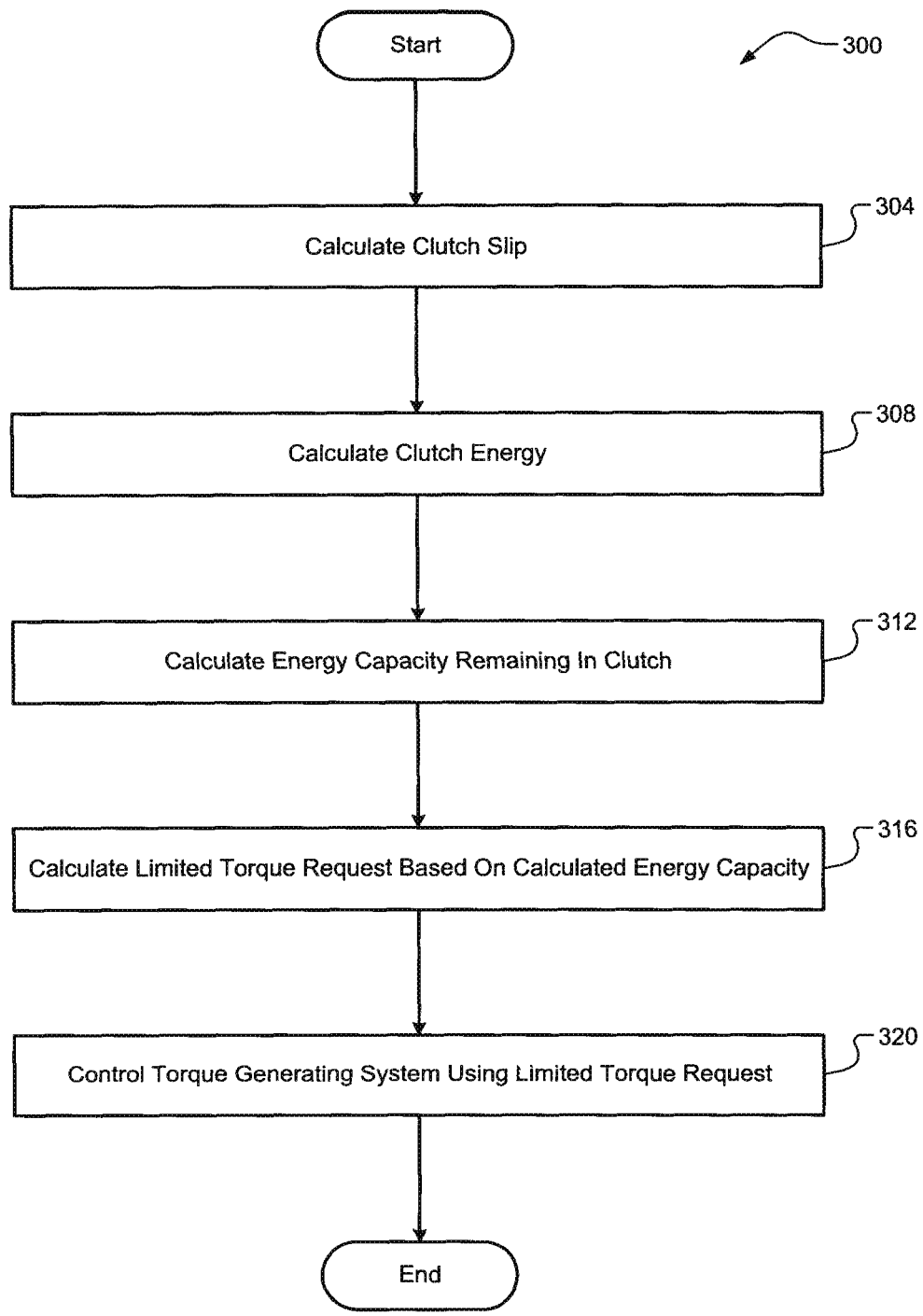
FIG. 3 is an example flow diagram of another clutch protection method according to the principles of the present disclosure.

Referring now to FIG. 3, an example flow diagram of a clutch protection method 300 is illustrated. At 304, the controller 140 calculates the clutch slip. In one exemplary implementation, the clutch slip is calculated as previously described above with respect to FIG. 2. At 308, the controller 140 calculates the clutch energy. In one exemplary implementation, the clutch energy is calculated as previously described above with respect to FIG. 2. At 312, the controller 140 calculates an energy capacity remaining in the clutch 124 until damage potentially occurs based on the calculated energy.

In other words, the controller 140 determines how much additional energy the clutch 124 is capable of receiving before damage to the clutch 124 potentially occurs. In one exemplary implementation, this additional energy could be calculated based on a difference between a maximum allowable energy that the clutch 124 is capable of receiving and (ii) the calculated energy. The maximum allowable energy, for example, could be predetermined or otherwise calculated based on known system parameters, such as the type/design of the manual transmission 112 and its clutch 124, the type/design of the torque generating system 104, and the like. For example only, this maximum allowable energy could be specified by a designer of the clutch 124.

At 316, based on the calculated energy capacity, the controller 140 calculates or generates a limited torque request corresponding to an amount of allowable torque before full clutch engagement is complete. In one exemplary implementation, this includes calculating a time until full clutch engagement based on a rate at which the clutch slip is decreasing, and then calculating the torque request based on the calculated time At 320, the controller 140 controls the torque generating system based on the limited torque request. In one exemplary implementation, this limited torque control continues for a period or until the potential damage to the clutch 124 is no longer detected. The method 300 then ends or returns to 304.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A clutch protection system, comprising:
a manual transmission comprising a clutch and configured to transfer torque from a torque generating system to a drivetrain; and
a controller configured to:
calculate a slip of the clutch based on an input rotational velocity of a flywheel coupled to the torque generating system;
calculate an energy into the clutch based on the calculated slip;
calculate an accumulated energy into the clutch based on a rate of the calculated energy;
limit a torque request for the torque generating system based on the calculated accumulated energy; and
control the torque generating system based on the limited torque request.

2. The system of claim 1, wherein the controller is configured to limit the torque request using a lookup table of clutch slip versus accumulated energy.

3. The system of claim 1, wherein the controller is further configured to limit the torque request using a lookup table of clutch slip versus torque.

4. The system of claim 1, wherein the controller is further configured to limit the torque request using a lookup table of clutch slip versus time in slip.

5. The system of claim 1, wherein the manual transmission is not associated with a gear position sensor or a clutch position sensor.

6. The system of claim 1, wherein the controller is configured to:
delimit the limited torque request after a period; and
control the torque generating system based on the torque request.

7. A clutch protection system, comprising:
a manual transmission comprising a clutch and configured to transfer torque from a torque generating system to a drivetrain; and
a controller configured to:
calculate a slip of the clutch based on an input rotational velocity of a flywheel coupled to the torque generating system;
calculate an energy into the clutch based on the calculated slip;
based on the calculated energy, calculate an energy capacity remaining in the clutch until a predetermined threshold indicative of damage to the clutch;
based on the calculated energy capacity, calculate a limited torque request corresponding to an amount of allowable torque before full clutch engagement is complete, the calculated limited torque request being less than a torque request for the torque generating system; and
control the torque generating system based on the calculated limited torque request.

8. The system of claim 7, wherein the controller is further configured to:
calculate a time until full clutch engagement based on a rate at which the clutch slip is decreasing; and
calculate the torque request based on the calculated time.

9. The system of claim 7, wherein the manual transmission is not associated with a gear position sensor or a clutch position sensor.

10. The system of claim 7, wherein the controller is further configured to:
after a period, control the torque generating system based on the torque request.

* * * * *